(12) United States Patent
Thompson et al.

(10) Patent No.: US 8,339,729 B2
(45) Date of Patent: Dec. 25, 2012

(54) EFFICIENT MOVES VIA REPOSITORY

(75) Inventors: Nathan Christopher Thompson, Boulder, CO (US); Matthew Thomas Starr, Lafayette, CO (US)

(73) Assignee: Spectra Logic Corp., Boulder, CO (US)

( * ) Notice: Subject to any disclaimer, the term of this patent is extended or adjusted under 35 U.S.C. 154(b) by 0 days.

(21) Appl. No.: 13/114,159

(22) Filed: May 24, 2011

(65) Prior Publication Data

US 2012/0300343 A1 Nov. 29, 2012

Related U.S. Application Data

(63) Continuation of application No. 13/113,695, filed on May 23, 2011.

(51) Int. Cl.
G11B 15/68 (2006.01)
(52) U.S. Cl. ..................................... 360/92.1
(58) Field of Classification Search .................. 360/92.1
See application file for complete search history.

(56) References Cited

U.S. PATENT DOCUMENTS

| | | | |
|---|---|---|---|
| 4,386,382 A | 5/1983 | Cutler et al. |
| 5,128,912 A | 7/1992 | Hug et al. |
| 5,157,564 A | 10/1992 | Theobald et al. |
| 5,235,474 A | 8/1993 | Searle |
| 5,442,500 A | 8/1995 | Hidano et al. |
| 5,521,586 A | 5/1996 | Takashita |
| 5,526,217 A | 6/1996 | Gormley et al. |
| 5,684,654 A | 11/1997 | Searle et al. |
| 5,738,537 A | 4/1998 | Setoguchi et al. |
| 5,768,047 A | 6/1998 | Ulrich et al. |
| 5,818,723 A | 10/1998 | Dimitri |
| 5,867,344 A | 2/1999 | Ellis et al. |
| 5,940,355 A | 8/1999 | Buckland et al. |
| 5,995,320 A | 11/1999 | Ostwald |
| 6,034,928 A | 3/2000 | Inoue |
| 6,215,611 B1 | 4/2001 | Gibbons |
| 6,266,574 B1 | 7/2001 | Searle et al. |
| 6,324,608 B1 | 11/2001 | Papa et al. |
| 6,411,462 B1 | 6/2002 | Ostwald et al. |
| 6,512,962 B2 | 1/2003 | Dimitri et al. |
| 6,600,703 B1 | 7/2003 | Emberty et al. |
| 6,639,751 B2 | 10/2003 | Brace et al. |
| 6,650,961 B2 | 11/2003 | Deckers |
| 6,661,602 B2 | 12/2003 | Benson et al. |
| 6,704,832 B1 | 3/2004 | Ng |
| 6,782,448 B2 | 8/2004 | Goodman et al. |
| 6,796,813 B1 | 9/2004 | L'Hermet |
| 6,813,113 B1 | 11/2004 | Mueller et al. |
| 6,845,422 B2 | 1/2005 | Shimada et al. |

(Continued)

FOREIGN PATENT DOCUMENTS

JP 08255415 A 10/1996

*Primary Examiner* — Allen Cao
(74) *Attorney, Agent, or Firm* — Kenneth Altshuler

(57) ABSTRACT

A storage library is described that includes a shelf system adapted to support a number of tape cartridges. The storage library further includes a tape drive adapted to read and write data to and from tape cartridges. The storage library further possesses a temporary repository near the tape drive that is adapted to facilitate an exchange of a first tape cartridge intended to be loaded in the tape drive with a second tape cartridge ready to be removed from the tape drive with a single tape picker device.

20 Claims, 12 Drawing Sheets

U.S. PATENT DOCUMENTS

| | | |
|---|---|---|
| 6,859,854 B2 | 2/2005 | Kwong |
| 6,880,033 B1 | 4/2005 | Mahmoud et al. |
| 6,957,291 B2 | 10/2005 | Moon et al. |
| 7,028,314 B2 | 4/2006 | Coffin et al. |
| 7,039,924 B2 | 5/2006 | Goodman et al. |
| 8,233,231 B2 * | 7/2012 | Thompson et al. .......... 360/92.1 |
| 8,239,059 B2 * | 8/2012 | Thompson et al. ........... 700/214 |
| 2003/0040836 A1 | 2/2003 | Deckers |
| 2004/0181388 A1 | 9/2004 | Yip et al. |
| 2012/0076621 A1 * | 3/2012 | Thompson et al. ........... 414/267 |
| 2012/0076622 A1 * | 3/2012 | Starr et al. .................... 414/273 |

\* cited by examiner

EFFICIENT MOVES VIA REPOSITORY

CROSS-REFERENCE TO RELATED APPLICATIONS

This application is a Continuation Application of U.S. Ser. No. 13/113,695, entitled EFFICIENT MOVES VIA REPOSITORY, filed May 23, 2011, which is incorporated herein by reference.

BACKGROUND OF THE INVENTION

1. Field of the Invention

The present embodiments are directed to a data cartridge magazine library that is useful in storing data on a recording medium located in a cartridge and/or retrieving data from such a recording medium.

2. Description of Related Art

Presently, data cartridge magazine libraries transfer tape cartridges via a data cartridge magazine between a shelf system and a tape drive. If access to a target tape cartridge is required, for reading and/or writing data, the target tape cartridge disposed in a magazine is moved from a shelf system to the target tape drive where the target tape cartridge is loaded therein. Following any access requirement, the tape cartridge is returned to the shelf system via the corresponding magazine before a different tape cartridge often in a different magazine is accessed. These basic operations are essentially repeated each and every time a new tape cartridge is accessed.

It is to innovations related to this subject matter that the claimed invention is generally directed.

SUMMARY OF THE INVENTION

The present embodiments generally relate to a cartridge magazine-based library that reduces the number of robotic motion steps between a shelf system and drive by incorporating a transitional repository that temporarily holds cartridges near the drive. Some embodiments of the present invention contemplate a data storage library comprising a temporary repository that is adapted to temporarily hold a first data cartridge after being ejected from a drive and prior to being disposed in a magazine, a picker device arranged to move a second data cartridge from the magazine to the drive when the first data cartridge is disposed in the temporary repository.

Other embodiments of the present invention can therefore comprise a data storage library arranged to perform a method, the method comprising moving a second portable data cartridge from a second slot in a portable magazine to a data transfer device while a first portable data cartridge is retained in a temporary repository, prior to being retained in the temporary repository the first portable data cartridge was engaged in a cooperating relationship with the data transfer device; and disposing the first portable data cartridge device in the second slot after the moving step.

Yet other embodiments of the present invention can therefore comprise a storage library arranged to perform a method, the method comprising: receiving a first set of instructions from a host computer to unload a first data storage cartridge from a cartridge data transfer device and return the first data storage cartridge to a designated location in a shelf system; responding to the host computer that the first set of instructions are complete, even though the first set of instructions have not been physically carried out; receiving a second set of instructions from the host computer to move a second data storage cartridge from the shelf system and load the second data storage cartridge in the cartridge data transfer device; transporting the second data storage cartridge from the shelf system to a position where a picker device is capable of disposing the second data storage cartridge in the cartridge data transfer device, the second data storage cartridge is disposed in a magazine that accommodates a plurality of data storage cartridges; removing the first data storage cartridge from the cartridge data transfer device via the picker device and disposing the first data storage cartridge in a repository; loading the second data storage cartridge in the cartridge data transfer device; and removing the first data storage cartridge from the repository; disposing the first data storage cartridge in the magazine; and transporting the magazine possessing the first data storage cartridge back to the shelf system.

And, yet other embodiments of the present invention can therefore comprise a library storage system adapted to replace a first storage cartridge relating with a cartridge data transfer device with a second storage cartridge using a robotic transporter that essentially makes a first move carrying the second storage cartridge disposed in a magazine, adapted to support a plurality of storage cartridges, from a shelf system to deliver to the cartridge data transfer device and a second move, using the robotic transporter, returning the first storage cartridge disposed in the magazine to the shelf system, the first move occurs before the second move.

DETAILED DESCRIPTION

This application is a Continuation Application of U.S. Ser. No. 13/113,695, entitled EFFICIENT MOVES VIA REPOSITORY, filed May 23, 2011, which is incorporated herein by reference.

Figure 1:
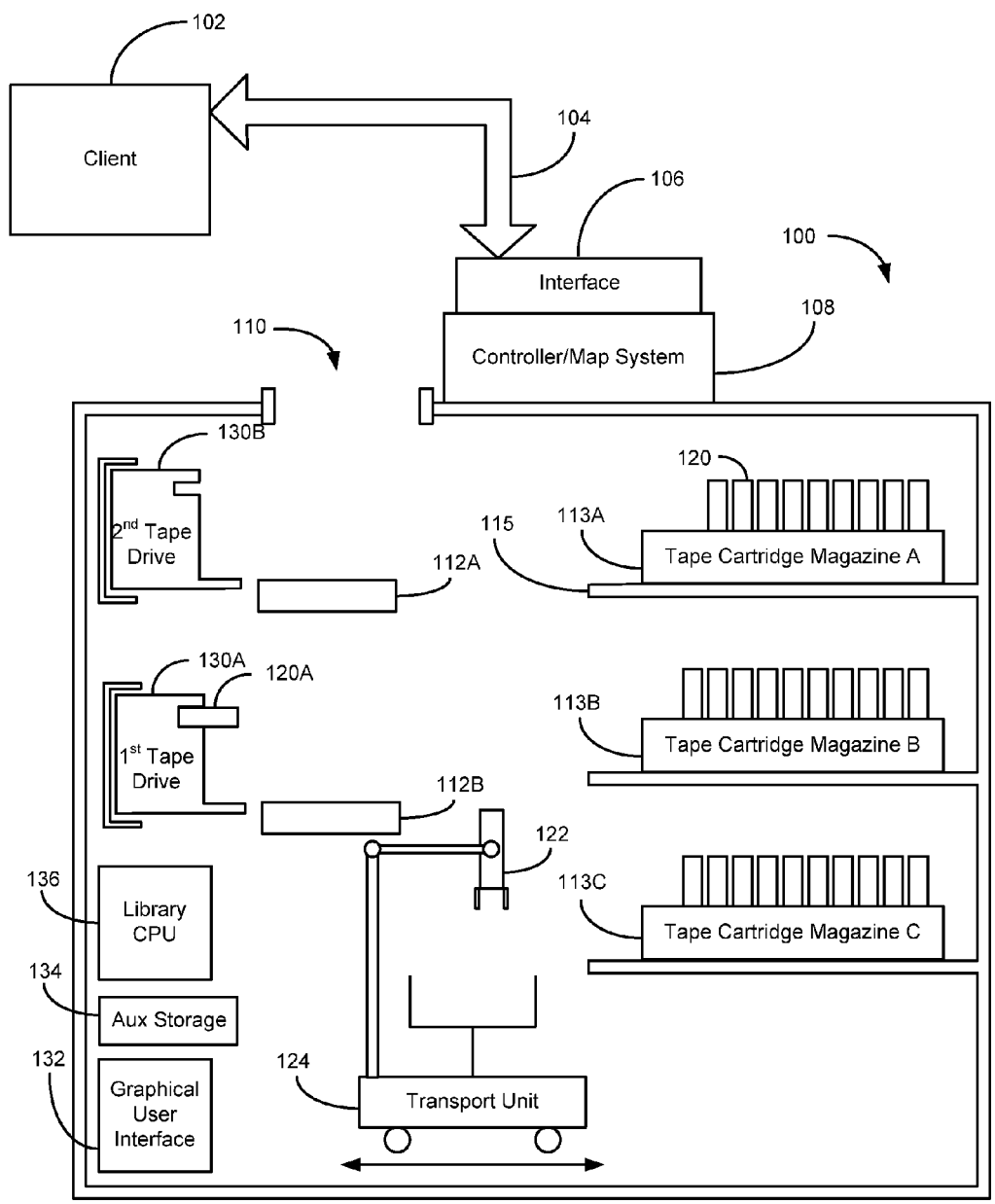
FIG. 1 is an illustration of a data storage arrangement constructed in accordance with certain embodiments of the present invention.

Referring to the drawings in general, and more specifically to FIG. 1, shown therein is an illustration of a data storage arrangement constructed in accordance with various embodiments of the present invention. In what follows, similar or identical structures may be identified using identical callouts.

The data storage arrangement illustrated in FIG. 1 can comprise a user of data 102, such as a client or host, in communication with a data storage library 100. As illustratively shown, the client 102 is in communication with the library 100 via a communication path 104 and the library interface device 106. The library 100 comprises a plurality of tape cartridges 120 disposed in a tape cartridge magazine, such as tape cartridge magazine 'A' 113A. Herein, tape cartridge magazine 113 will be used to denote a generic cartridge magazine and tape cartridges 120 will be used to denote a generic cartridge. Each tape cartridge magazine 113 contains a plurality of slots (shown in FIG. 2) wherein each slot is adapted to accommodate a tape cartridge 120. A tape cartridge 120 is one embodiment of a portable data storage cartridge, which can include other cartridge devices such as portable solid state devices, tape drive cleaning cartridges, conventional magnetic disk drives adapted for portability, such as in a cartridge, and other storage elements packaged accordingly, which are distinguishable over storage elements such as stand-alone disks.

Here, the library 100 may be configured to maintain a map of the slots in each magazine 113. More specifically, each slot in a magazine 113 will have a unique identification, such as an address, that is identifiable by the host computer 102 via a map of logical addresses provided by the library 100, and such as a map system 108, in this example. A tape cartridge 120 disposed in a particular slot may assume the identity of the particular slot for purposes of the mapping system 108. Hence, a tape cartridge 120 disposed in a third slot having an address mapped as slot number three will assume the identity of slot number three. In other words, the tape cartridge will be mapped and identified as "slot number three" in this example. Optionally, a tape cartridge 120 can be simply identified by a serial number, or other indicia (such as a bar code, medium auxiliary memory information, etc.), and be assigned, or mapped, to a slot, by a host computer 102, for example.

The library 100 can further comprise at least one robotic transporter 124, though in optional library embodiments, multiple transporters exist. The robotic transporter 124 comprises a carriage or other transporting means to carry a tape cartridge magazine 113 from the shelf system 115 to a position ready to load a tape cartridge 120 into a tape drive 130A or 130B. Generically, a tape drive is denoted herein as element 130. In the present embodiment, the shelf system 115 is arranged to archive the tape cartridge magazines 113, or independent tape cartridges 120, within the library 100. A data transfer device facilitates data storage operations (such as, reading and writing) to and from a portable data cartridge device, such as a tape cartridge, solid state memory cartridge, or other portable memory device within the spirit of the embodiments described herein. By way of example, a tape drive 130 is an embodiment of a data transfer device that is adapted to cooperate, or relate, with a portable data storage cartridge. Hence, if a data storage cartridge is a portable solid state device, a data transfer device will likely include a connector device that connects with the solid state device, thus, facilitating storage operations between a client 102 and the portable solid state device, for example. An example of a robotic transporter 124 is a robotic device that moves along a rail system via a belt device, a motorized rack and pinion arrangement, a lead screw arrangement, a motor with wheels, etc. The tape cartridge 120 can be loaded into or removed from a tape drive 130 via a picker device 122 that is carried by the robotic transport 124, for example. The cooperating relationship between a tape cartridge 120 and a tape drive 130 is one that facilitates data storage operations, such as reading and writing data to and from the cooperating tape cartridge 120. In an optional embodiment, the tape cartridges 120 may be associated with different users of data, which can occur when the storage resources in the library 100 are divided into two or more partitions wherein each partition is associated with the different user of data, for example. The position ready to transfer the tape cartridge 120 into a tape drive from a magazine 113 is a location that facilitates a tape cartridge 120 to be inserted in one of the drives 130A or 130B, such as tape cartridge 120A shown in a cooperating relationship with the first tape drive 130A. In the present embodiment, the position ready to transfer the tape cartridge 120 into a tape drive from a magazine 113 does not require further movement via the robotic transporter 124, rather the picker device 124 moves a cartridge 120 from the magazine 113 to a drive 130. This is also a position that can facilitate the transfer of a tape cartridge 120 to a temporary repository location 112A or 112B just prior to loading the tape cartridge 120 in a tape drive 130. Generically, a temporary repository is denoted herein as element 112.

The library 100 also optionally comprises an entry/exit port 110 whereby tape cartridges 120 or tape cartridge magazine 113 comprising a plurality of tape cartridges 120 can be transferred between an environment external to the library 100 and an environment internal to the library 100. In this embodiment, the library 100 comprises a graphical user interface 132 and an auxiliary memory 134, such as one or more disk drives, solid state memory or other non-volatile memory device/s capable of retaining (storing) relevant information, such as mapping address information of each tape cartridge 120, for example. The library 100 further possesses a computer or Central Processing Unit (CPU) 136 that houses at least on macro controller that actively cooperates with algorithms to orchestrate actions to components within the library 100, for example, over a Computer Area Network (CAN), not shown. The library 100 possesses a controller/map system 108, which can optionally be functionally included with the CPU 136. The controller/map system 108 maintains the addresses of the components mapped out for the client 102 (i.e., tape slot addresses, drive addresses, robot addresses, etc.) to direct operations within the library 100. FIG. 1 is illustrative of basic components used to exemplify inventive embodiments disclosed herein. As one skilled in the art will appreciate, a data storage library will generally include devices and structures not shown in the block illustration of FIG. 1, such as additional controllers (e.g., those controlling other components in the library including the robotic transporter 124), wiring, cooling systems, switch systems, lighting, protocol bridges, etc.

The client 102, or host computer, identifies (or "sees") the components within the library 100 by transmitting a Small Computer Systems Interface (SCSI) inquiry to scan the storage system's bus (not shown) to discover what devices comprise the storage system 100. Optionally, the map system 108 can provide the information directly to the client 102. An inquiry can be a client 102 effectively asking the storage system 100 "who are you?" and "what are you?" The storage system 100 can be displayed showing a plurality of tape cartridges 100 located at specified slot addresses and showing that there are two tape drives 130A and 130B at designated addresses and a transporter 124 and/or picker device 122 at designated addresses that are able to receive instructions from the client 102, for example.

Also, illustratively shown in FIG. 1 are transitional repositories 112A and 112B located near the tape drives 130, i.e., in close proximity. As will be discussed below in more detail, the transitional repositories 112 are adapted to temporarily hold tape cartridges 120 while the picker device 122 swaps out tape cartridges 120 between uses in a tape drive 130 and being disposed in a magazine 113. In an exemplary embodiment, a transitional repository 112 can be located nearby a tape drive 130, such as immediately above or under a tape drive 130. In an optional embodiment, a transitional repository 112 can be located within preferably forty-eight inches, more preferably thirty-six inches, more preferably twenty-four inches, and even more preferably twelve inches from a tape drive 130. In yet another optional embodiment, a plurality of tape drives 130A, 130B may each be associated with a transitional repository 112A and 112B, respectively, for example, or optionally, each of the plurality of drives 130A, 130B may share a single repository 112 or a single repository location adapted to accommodate a number of tape cartridges 120. After reviewing the present disclosure, a skilled artisan will appreciate that the transitional repository 120 is a temporary repository that is independent of the shelf system 120, which is adapted to archive the tape cartridges 210 and/or tape cartridge magazines 113 in the library 100. In certain embodiments, the temporary repository is a static receptacle built into the library 100. In certain embodiments, the client 102 identifies the tape cartridges 120 via corresponding addresses associated with each slot that accommodates a tape cartridge 120 (in this case a magazine 113 but in other cases each tape cartridge 120 is disposed in individual slots essentially making up a shelf system 115), however, in the present embodiment, the client 102 does not have knowledge or, optionally, does not "see" the temporary repository 112 because the temporary repository 112 does not have an address identifiable by the client 102. In an optional embodiment, the client 102 can identify the temporary repository 112 via one or more associated addresses. The temporary repository 112 is differentiated from a shelf system, whereby the shelf system is intended to archive cartridges in a library. The temporary repository 112 is intended to be used for seconds if not minutes, in contrast to the shelf system 115, which is intended to archive tape cartridges 120 in a permanent or semi-permanent manner, such as for days if not months (or even years).

Figure 2A:
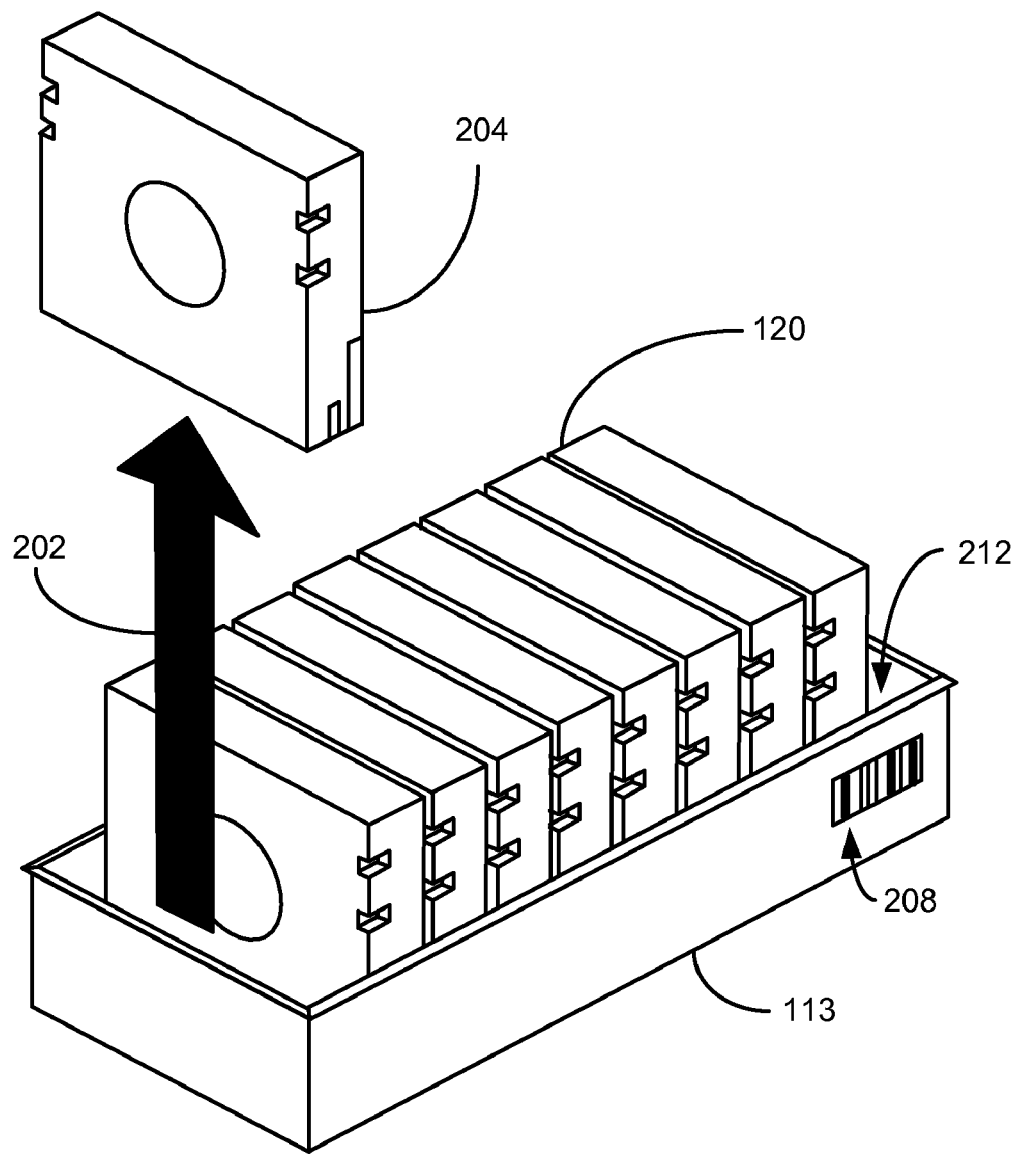
FIG. 2A shows a perspective illustration of a tape magazine supporting tape cartridges constructed in accordance with certain embodiments of the present invention.

With reference to FIG. 2A, shown therein are tape cartridges 120 supported by a tape cartridge magazine 113. In more detail, a tape cartridge 120, such as an LTO-3 category tape cartridge, comprises magnetic tape that is capable of storing digital data written by a compatible drive 130 or 132, such as an LTO-3 tape drive manufactured by IBM, when in cooperation to read and write data (i.e., loaded) with the tape cartridge 120, as shown in FIG. 1. The tape cartridge magazine 113 is illustratively shown populated with a plurality of tape cartridges 120. A tape cartridge 120 can be removed from the tape cartridge magazine 113, as shown by the arrow 202, and inserted into a tape drive 130 by means of a picker device 142, shown in FIG. 1. Disposed on the tape cartridge magazine 113 is a bar code identifier 208 for identifying the tape cartridge magazine 113, which has utility should the tape cartridge magazine 113 be archived in a media pack storage vault that is remote from a library (i.e., not in a library), for example. In some embodiments, all tape cartridges 120 contain a Medium Auxiliary Memory (MAM) device (not shown), however, in alternative embodiments, some tape cartridges may not contain a MAM device. One example of a MAM device is a flash memory device that is activated by radio frequency. In other embodiments of the present invention, the magazine 113 can comprise a magazine auxiliary memory device (not shown) that is capable of containing information (such as tape slot address mapping information, i.e., a tape cartridge corresponding to "slot-1" can retain the identity of "slot-1" on the tape cartridge's MAM) from at least one of the data cartridges 120 that the magazine 113 supports. The magazine auxiliary memory device 112 can receive information that is maintained on the tape cartridge MAM devices contained via one or more MAM device readers/writers associated with a tape drive 130, or some reader not associated with a tape drive 130, for example. Information from the MAM devices can be read and immediately transmitted to the magazine auxiliary memory device, or alternatively, the information of each MAM device can be stored on the auxiliary storage device 134 and then transferred to the magazine auxiliary memory device, just to name two examples.

A MAM device, in one embodiment, is parceled into three regions in which data can be stored: a medium device region, which contains information such as a serial number (or some information corresponding to a tape's bar code, for example), a device region which can contain information from the tape drive such as load count, and host/vendor unique region wherein information such as history and/or performance data related to the cartridge 120 can be stored. The information in the regions can be supplemented with new information via an address related to the arrangement of available storage space in the cartridge MAM device. Optionally, the information can be read by an auxiliary memory reader, such as a MAM reader, and reassembled with additional information and stored on the MAM device as the reassembled version, just to name two examples. In another example, if the storage limit is reached in the MAM device, such as the host/vendor data in the host/vendor unique region, the host/vendor data can be read and stored in an auxiliary storage space, such as the auxiliary memory 134, and the host/vendor unique region purged and made available for new information. In another example, the host/vendor data can be compressed with algorithms to decompress residing in the library 100 or user of data, for example.

Figure 2B:
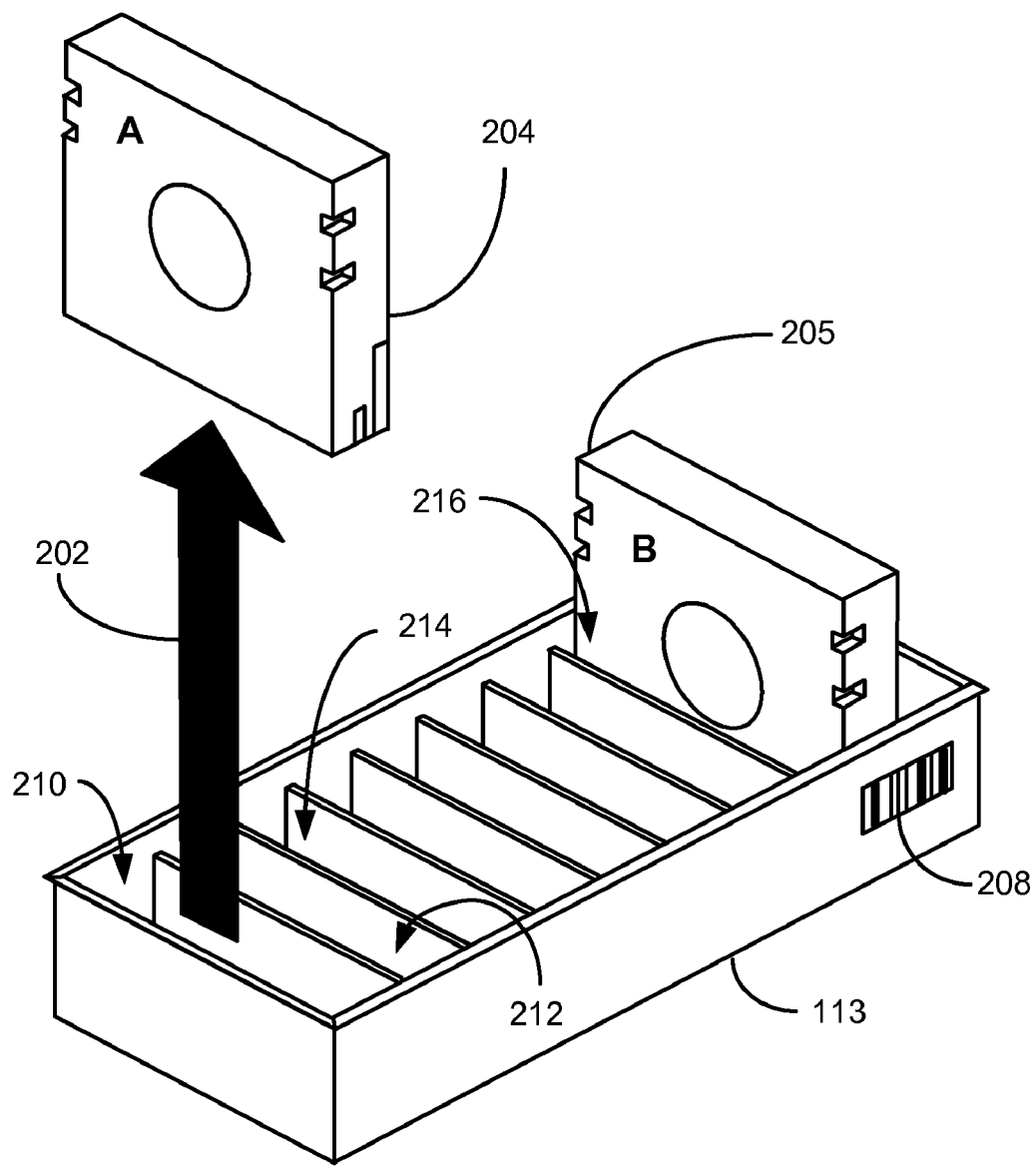
FIG. 2B shows a perspective illustration of a tape magazine revealing tape cartridge slots constructed in accordance with certain embodiments of the present invention.

FIG. 2B is an illustration of a mostly empty magazine 113 consistent with embodiments of the present invention. Here, in one exemplary embodiment, the magazine 113 possesses a plurality of slots, such as a first slot 210, a second slot 212, a third slot 214, etc. The depicted magazine 113 can be mapped to a client 102 as possessing slots one through nine. The tape cartridge "A" 204 originated from the first slot 210 and, therefore, is also mapped to correspond to the first slot 210 address, or more specifically, the tape cartridge 204 with an address associated with the first slot 210. Tape cartridge "B" 205 is the only other tape cartridge shown in FIG. 2B and is disposed in the eighth slot 216. The tape cartridge "B" 205 resides in the eighth slot 216 and, therefore, is also mapped as corresponding to the eighth slot 216 address, or more specifically, the tape cartridge 205 possessing an address associated with the eighth slot 216.

Figure 3A:
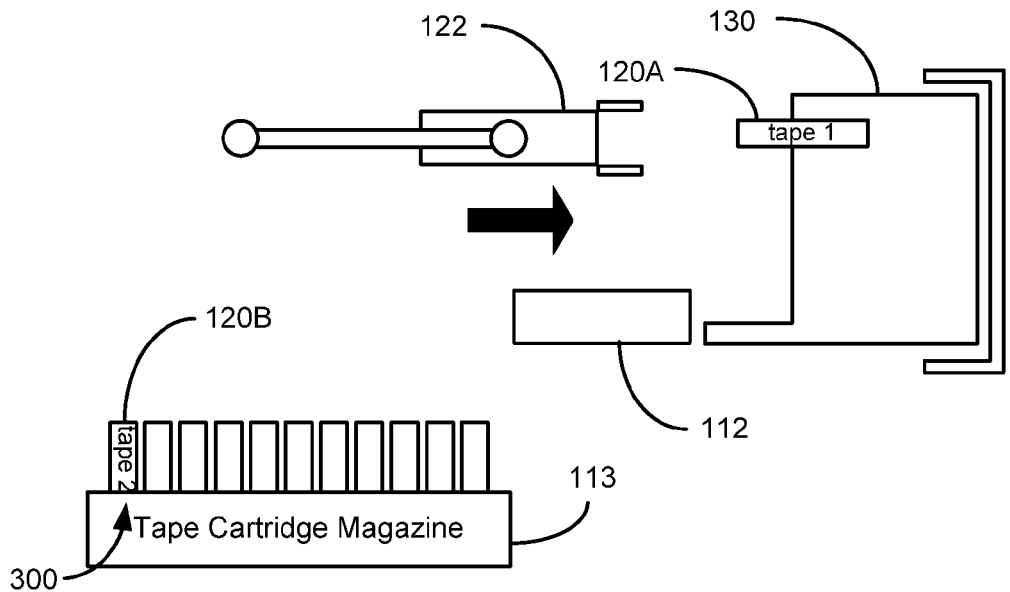
FIGS. 3A-3F are illustrations of a transporter and picker device cooperating with a repository system constructed in accordance with an embodiment of the present invention.
Figure 3B:
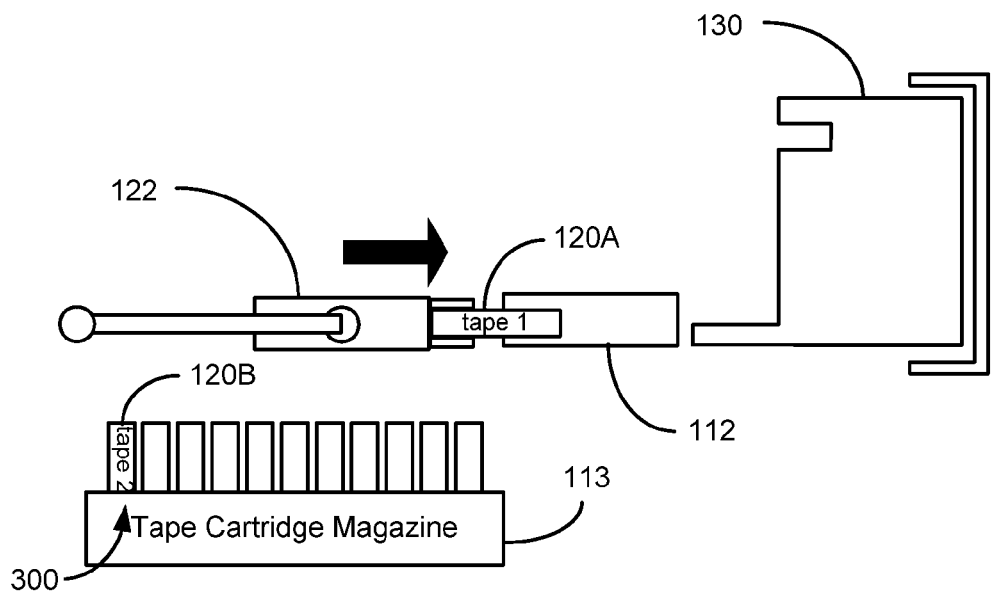
Figure 3C:
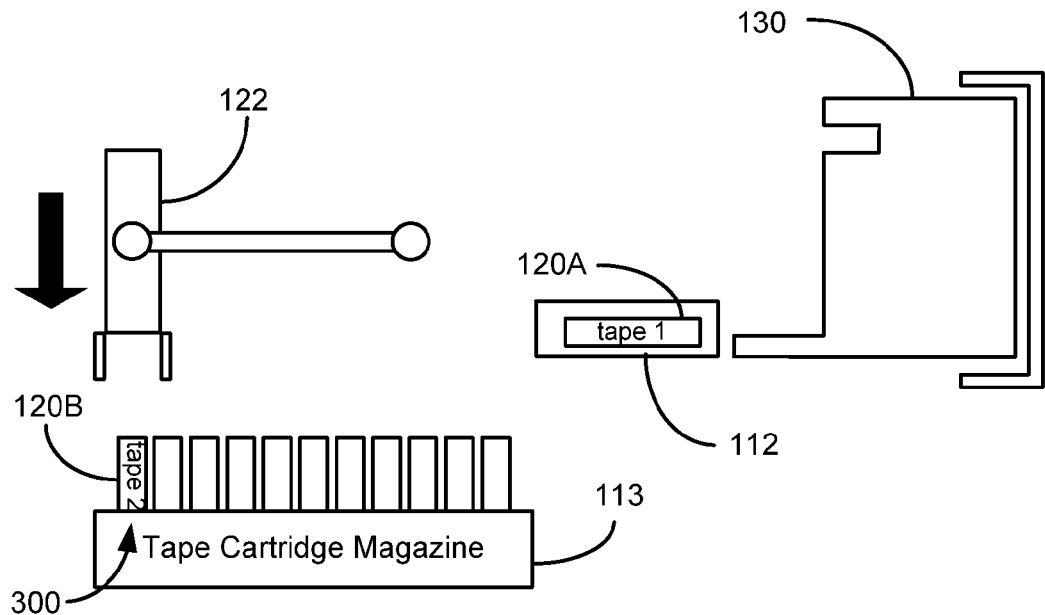
Figure 3D:
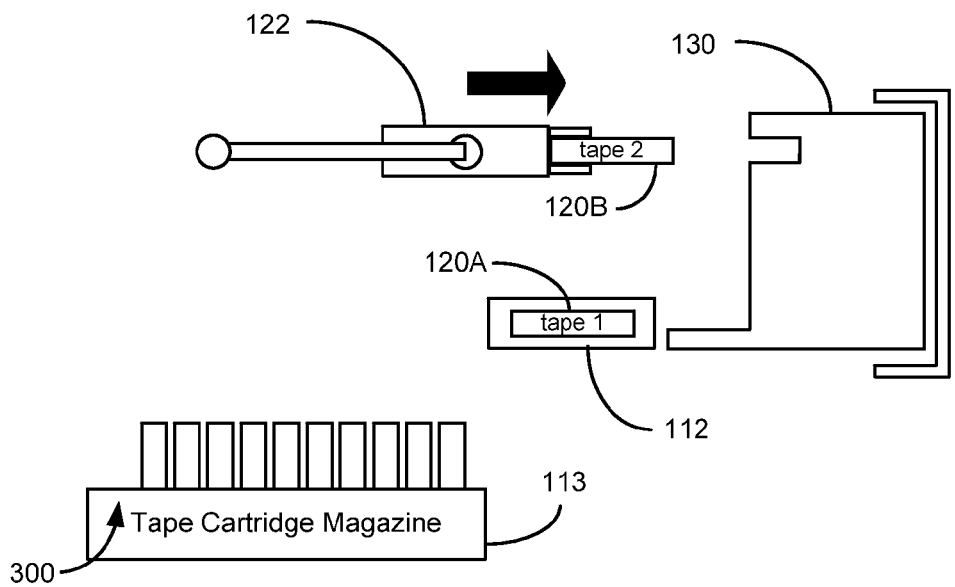
Figure 3E:
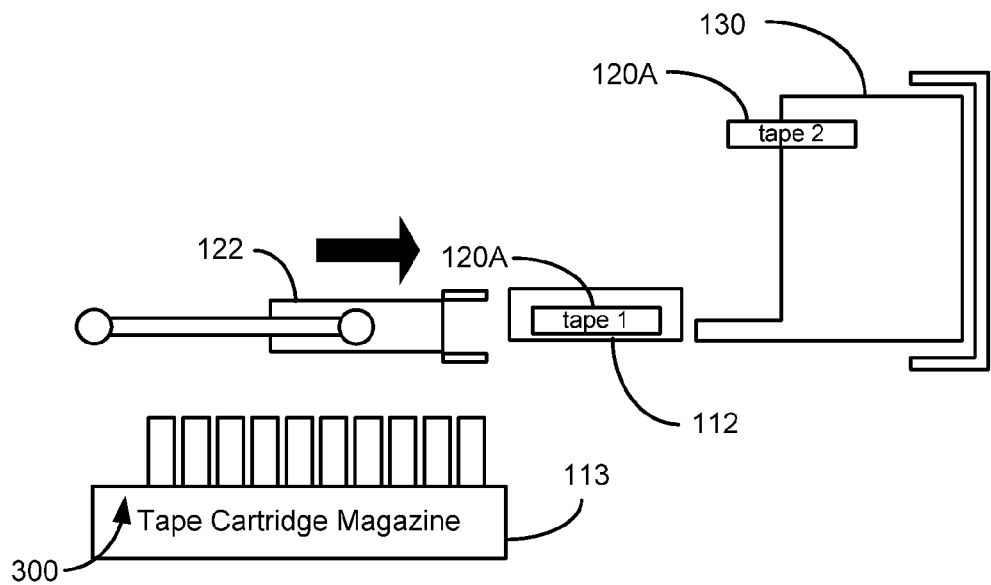
Figure 3F:
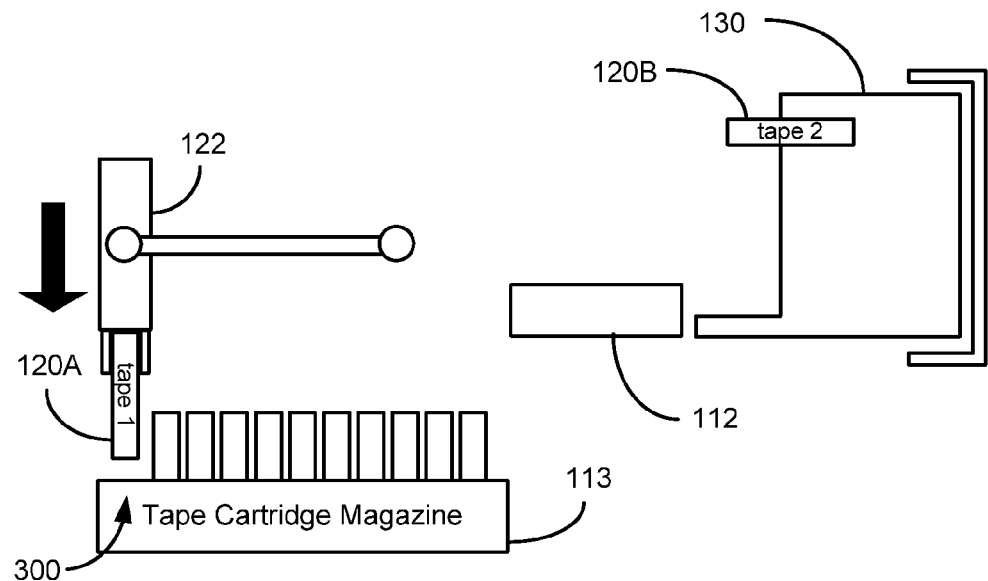
Figure 4:
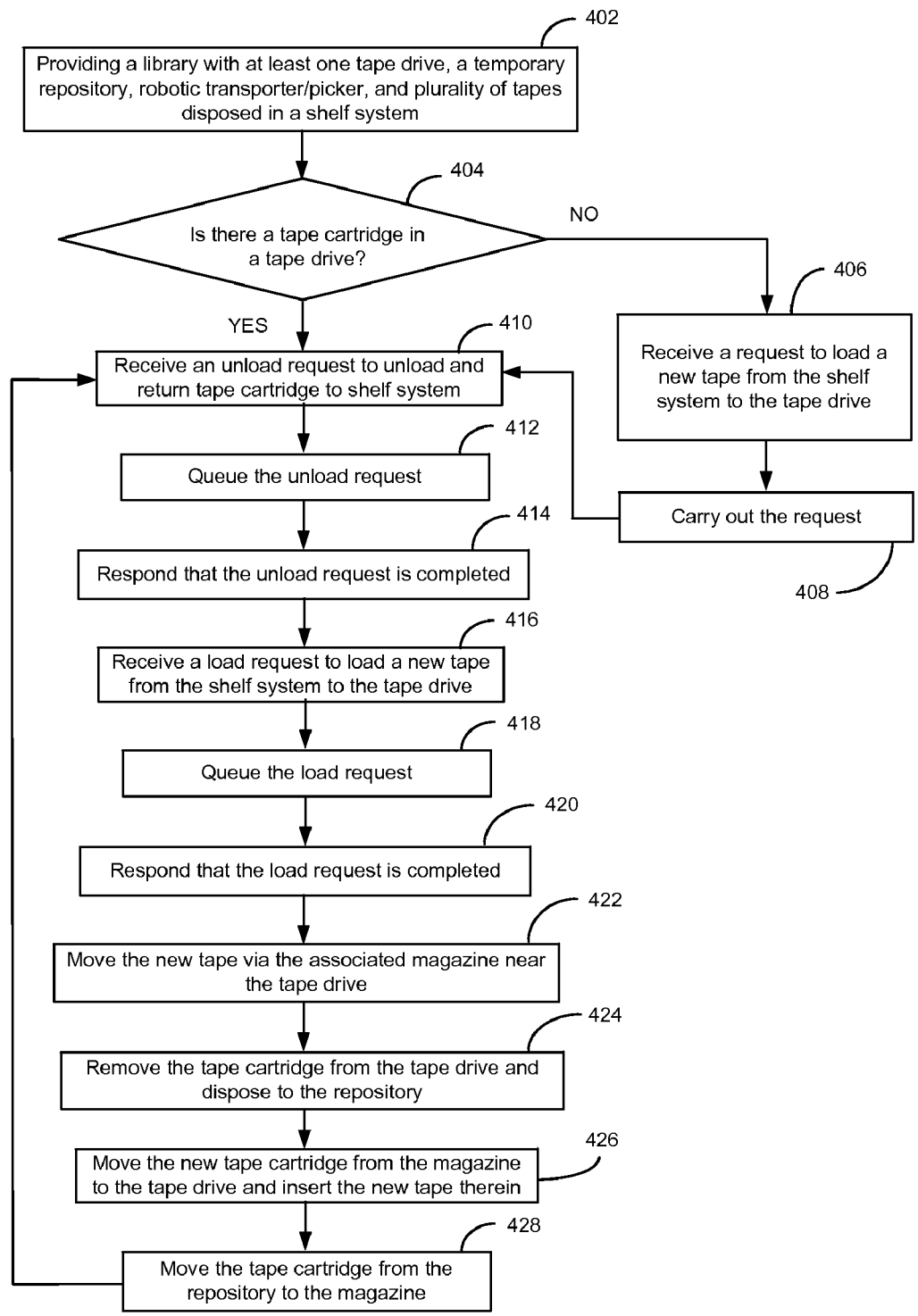
FIG. 4 is a block diagram of a method consistent with certain embodiments of the present invention.

FIG. 4 illustrates an embodiment of a method for efficiently moving tape cartridges 120 within a storage library 100 by essentially swapping a first tape cartridge 120A with a second tape cartridge 120B in relation to a commonly used a tape drive 130. FIG. 4 is described in conjunction with FIGS. 3A-3F and FIG. 1. It should be recognized that the steps presented in the described embodiments of the present invention do not necessarily require any particular sequence unless otherwise stated. With reference to step 402 in conjunction with FIG. 1, the library 100 is generally provided with a first tape drive 130 and a second tape drive 130B, a temporary tape cartridge repository locations 112A and 112B, a robotic transporter 124 with a picker device 122, and a plurality of tape cartridges 120 disposed in a magazine 113 located at the shelf system 115. A client 102 queries the library 100 to determine the library's configuration. As shown by the diamond 404, if there is a tape cartridge 120 present in a target tape drive 130, then proceed to step 410, otherwise proceed to step 406. Step 406 is a block showing the receipt of a request to move a first tape cartridge 120A from the associated slot and load the first tape cartridge 120A in the tape drive 130. The first tape cartridge 120A is identified by the host 120 via an associated logical address, hereinafter, for simplicity, the logical address will be slot-1. The load request is simplified herein for ease of illustration, however, in actuality, there is a sequence of instructions that occurs, including identifying and moving the first tape cartridge 120A from the shelf system 115 (more specifically slot 1) to loading the first tape cartridge 120A in an engaged, cooperating relationship with the tape drive 130 ready to perform read/write operations, etc. Step 408 essentially carries out the request to move the first tape cartridge 120A, which is disposed in the magazine 113, from the shelf system 115 and load the first tape cartridge 120A in the tape drive 130. When the first tape cartridge 120A has completed all storage operations for the client 102, then proceed to step 410. Here, the library 100 receives an unload request, e.g., from the client 102, to unload the first tape cartridge 120A from the tape drive 130 and return the first tape cartridge 120A back to its associated slot address (slot 1). As shown in block 412, the storage system 100 queues the unload request in a queue system, that in one embodiment is maintained by the library CPU 136 and memory associated therewith. In an optional embodiment, the queue system can comprise a processor and memory, independent from the library CPU 136, adapted to perform the queuing steps discussed herein. As shown in block 414, the library 100 can respond to the client 102 that the unload request is complete prior to actually carrying out the unload request. In certain storage systems, the client 102 will not issue any additional requests until the client 102 has confirmation that the present request (in this case the unload request) is completed (i.e., requests that are serial). As shown in block 416, after receiving the "virtual" confirmation that the unload request was completed, the client 102 issues a second load request to the library 100 to move a second tape cartridge 120B from the associated logical address, to the tape drive 130 and load the second tape cartridge 130B therein to commence storage operations hereinafter for simplicity the logical address will be slot-2. At this point, the library 100 can manipulate the unload request and the second load request in a more efficient, time-saving, sequence of moves. In an embodiment, as shown in step 418, the second load request can be queued with the unload request with a further, optional, response to the client 102 that the second load request is completed, step 420, in order to alter the moves between the tape drive 130 and the repository 112, as will now be discussed.

With reference to FIG. 3A and continued reference to FIG. 4, the first depicted tape cartridge 120A is still in the tape drive 130 when the robotic transporter 124 brings the second depicted tape cartridge 120B to a location near the tape drive 130 via the magazine 113 (step 422). In certain embodiments, the location near the tape drive 130 is a position in which the robotic transport unit 124 is essentially stationary while the picker device 122 moves between the tape drive 130, the magazine 113, and the repository slot 112. As illustratively shown in FIG. 3A in conjunction with step 424, the picker device 122 grasps the first tape cartridge 120A and removes it from the tape drive 130. The arrow indicates the direction of the picker device 122. As illustratively shown in step 424 and FIG. 3B, the first tape cartridge 120A is unloaded and removed from the drive 130A via the picker device 122. The picker device then moves the first tape cartridge 120A to the temporary repository 112 and deposits the first tape cartridge 120A therein, thus freeing up the picker device 122 to retrieve the second tape cartridge 120B. As illustratively shown in step 426 and FIG. 3C, the picker device 122 grasps the second tape cartridge 120B from the corresponding magazine slot 300, which is logically mapped as slot-2. Slot 3 is used herein for convenience of the present description. As shown in step 426 in conjunction with FIG. 3D, the picker device 422 inserts the second tape cartridge 120B into the drive 130 whereby the second tape cartridge 120B becomes loaded in the drive 130 to form a cooperating read/write relationship. After inserting the second tape cartridge 120B in the drive, step 428 and FIG. 3E, the picker device 122 is shown reaching for the first tape cartridge 120A still located in the temporary repository 112. The picker device 122 grasps the first tape cartridge 120A, removes it from the temporary repository 112, and moves the first tape cartridge 120A to be inserted in the slot location 300 in the magazine 113 where the second tape cartridge 120B was previously, as shown in FIG. 3F in conjunction with step 428. After being disposed in the magazine 113, the slot 300, which now holds the first tape cartridge 120A, is remapped to logical address slot-1, which, as discussed earlier, corresponds to the first tape cartridge 120A. At this point, the robotic transporter 124 is free to move the magazine 113 back to the shelf system 115. In optional embodiments, the magazine 113 will remain next to the drive 130 awaiting new instructions from the host 102 in the event a tape 120 from that specific magazine 113 is instructed to be loaded in the drive 130 or a nearby drive. This process can essentially be repeated with each new request to unload a tape cartridge from a tape drive 130 and load a different tape cartridge in the tape drive 130, as shown by the flow diagram arrow going to step 410. In an optional embodiment, though the second tape cartridge 120B came from the slot 300, the first tape cartridge 120A is disposed in a different slot other than slot 300.

Figure 5A:
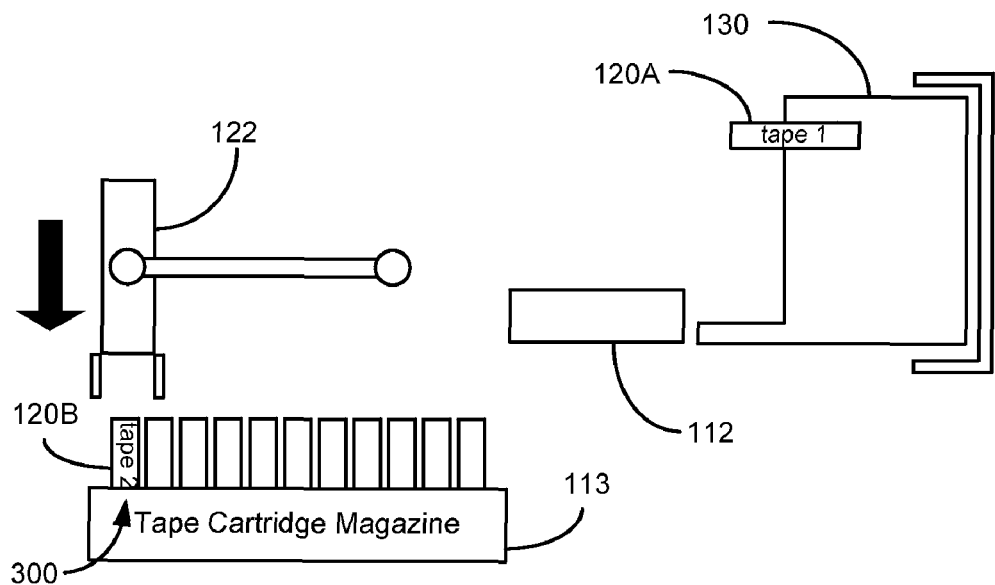
FIGS. 5A-5F are illustrations of a transporter and picker device cooperating with a repository system constructed in accordance with an embodiment of the present invention.
Figure 5B:
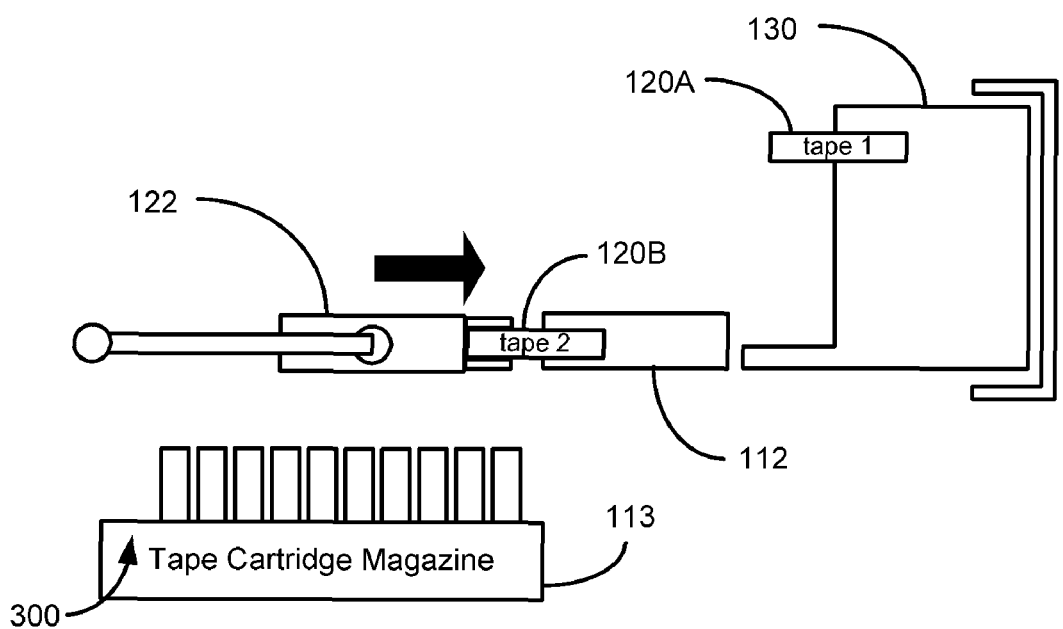
Figure 5C:
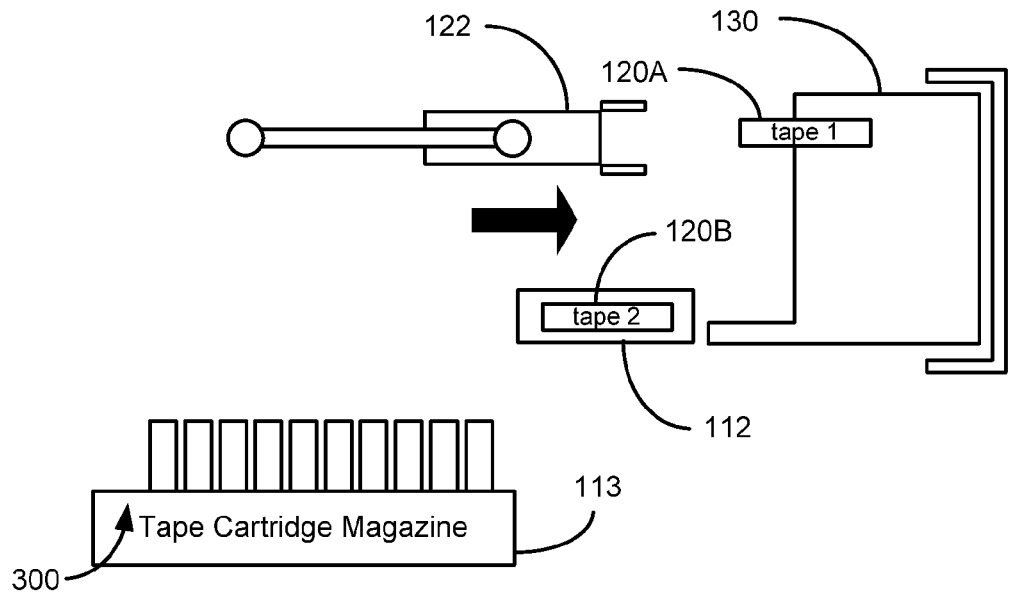
Figure 5D:
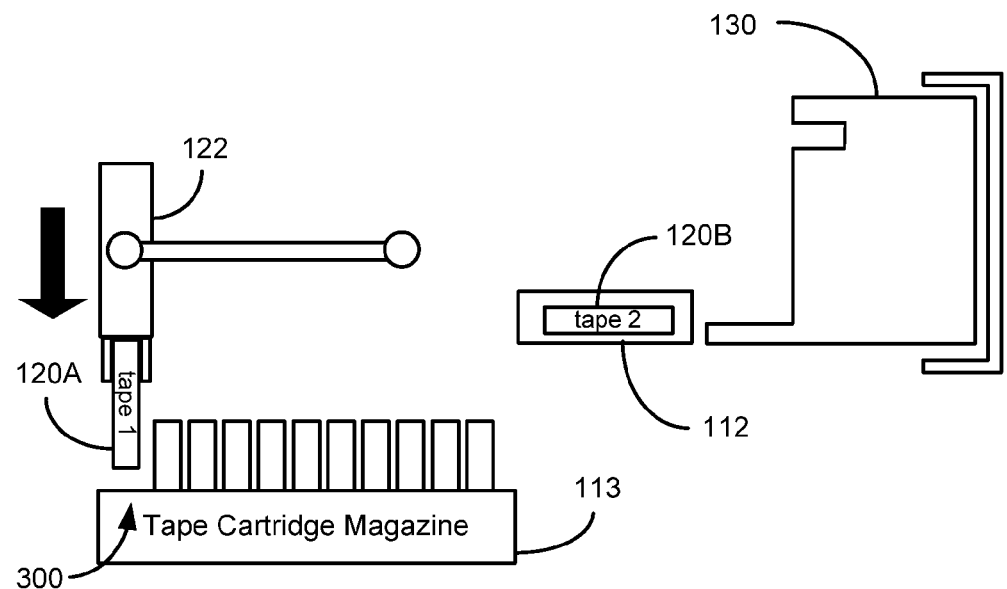
Figure 5E:
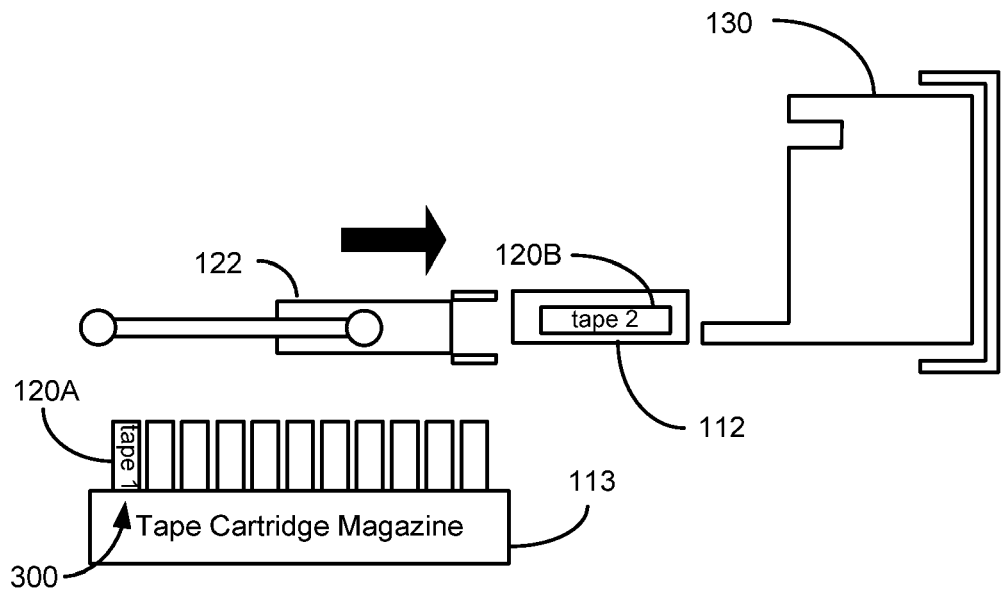
Figure 5F:
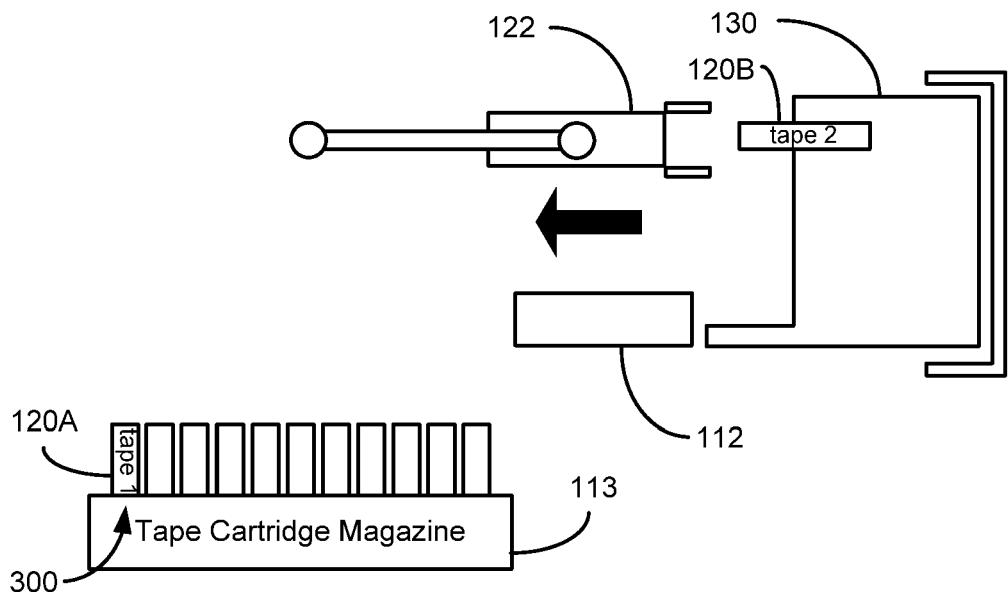
Figure 6:
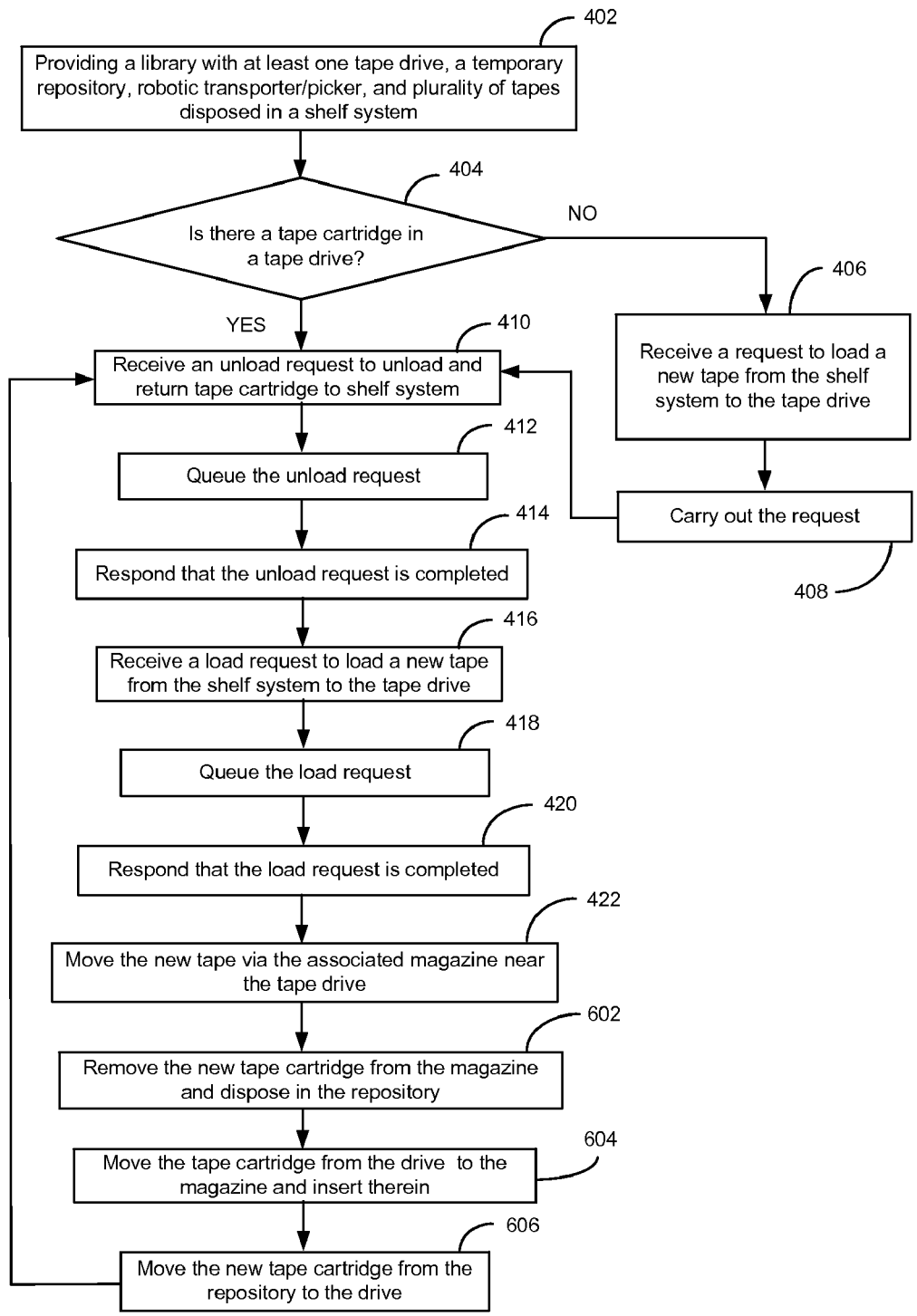
FIG. 6 is a block diagram of a method consistent with certain embodiments of the present invention.

In an optional embodiment, shown in FIGS. 5A-5F in conjunction with FIG. 6 and FIG. 1, a requested tape cartridge 120B is moved to the temporary repository 112 before loading in a drive 130. After a first tape cartridge 120A, engaged with the drive 130, is instructed to be returned to its logical slot location, in this case slot-1, and a second tape cartridge 120B is instructed to be loaded in the drive 130, a magazine 113 is moved into a position near the tape drive 130. As shown in FIG. 5A, the picker device 122 reaches for the second tape 120B (see arrow). As shown in step 602 and FIG. 5B, the second tape cartridge 120B is grasped by the picking device 122 and is moved to the temporary repository 112 to be temporarily disposed therein. After the second tape cartridge 120B is disposed in the temporary repository 112, the picker device 122 reaches and grasps the first tape cartridge 120A, which is located in the drive 130, FIG. 5C. After grasping the first tape cartridge 120A and removing it from the drive 130, the first tape cartridge is inserted in the open slot 300 in the magazine 113, FIG. 5D and step 604. In certain embodiments, the slot 300 is remapped as slot-1 from slot-2 sometime between when the second tape cartridge 120B was removed from the slot 300 to when the first tape cartridge 120A is disposed in the slot 300. Other embodiments contemplate remapping the slot 300 at some other time. After the first tape cartridge 120A is disposed in the magazine 113, FIG. 5E, the picker device 122 reaches for the second tape cartridge 120B located in the temporary repository 112, as depicted in FIG. 5E. FIG. 5F shows the second tape cartridge 120B inserted in the drive 130 after being moved from the temporary repository 112, step 606. At this point, the robotic transporter 124 is free to move the magazine 113 back to the shelf system 115. In optional embodiments, the magazine 113 will remain next to the drive 130 awaiting new instructions from the host 102 in the event a tape 120 from that specific magazine 113 is instructed to be loaded in the drive 130 or a nearby drive. This process can essentially be repeated with each new request to unload a tape cartridge from a tape drive 130 and load a different tape cartridge in the tape drive 130, as shown by the flow diagram arrow going to step 410.

Figure 7:
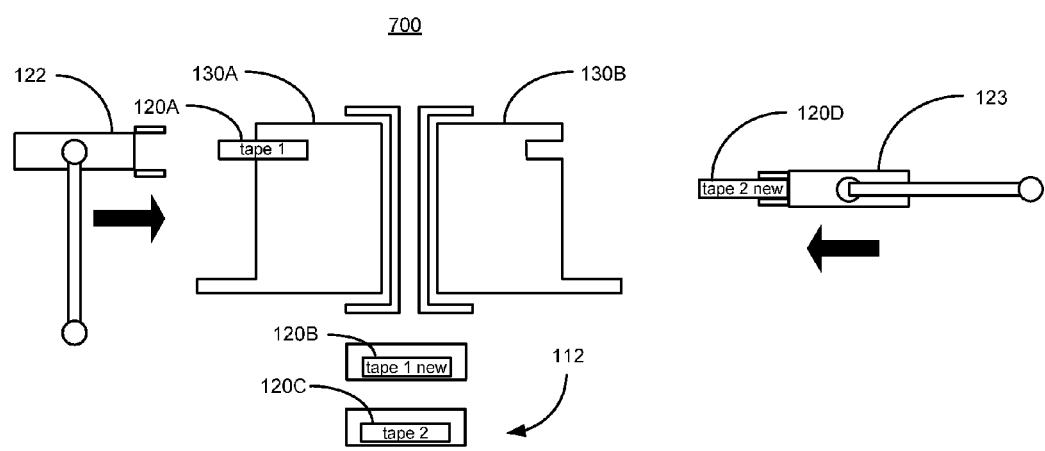
FIG. 7 is an illustration of a multi-robotic storage arrangement in accordance with certain embodiments of the present invention.

In certain embodiments, a tape cartridge library can possess multiple drives and multiple robotic transporters, each with an associated picker device, that cooperate with one another using the queuing system and temporary repository 112 to enhance efficiency with multiple moves and multiple move requests/commands. For example, as illustratively shown in FIG. 7, a tape library 700 possessing at least two tape drives 130A and 130B, each with a tape cartridge 120A and 120C, respectively, can receive a first unload command to return the first tape cartridge 120A back to a shelf system 115 and a second unload command to return the second tape cartridge 120C back to the shelf system 115. The first unload command can be queued for a first tape cartridge 120A and the second unload command can be queued for the second tape cartridge 120C. In some embodiments, the originator of the unload commands, such as a client 102, can be informed that each unload command is completed prior to actually carrying out the unload command in order to invoke the originator to send additional commands, such as the second unload command or new load commands, for example. After receiving a first and second load command to load new tapes 120B and 120D in the first and second tape drives 130A and 130B, respectively, a first robotic transporter and picker 122 can be directed, by the library 700, to move the first new tape cartridge 120B to the repository 112 and move the second tape cartridge 120C from the second tape drive 130B to the repository 112. The two picker devices 122 and 123 can be made to perform various moving sequences of moving tape cartridges 120 from the drives 130A and 130B to the temporary repositories 112 to improve or optimize load sequences to save time and/or energy, for example. In certain embodiments, the library 700 can choose an efficient move operation by way of evaluating multiple possible move combinations that could be implemented via the picker devices 122 and 123 based on tape cartridge location, robotic transporter location and other possible factors, for example.

In accordance with certain embodiments of the present invention, the robotic transporter 124 moves to the shelf system to pick up a magazine 113 that contains a new tape cartridge 120, moves the new tape to a position for a picker device 122 to access the temporary repository 112 and tape drive 130, all within a short distance. Preferably the robotic transporter 124 does not move at all between the tape drive and the repository, and the picker 122 alone moves cartridges between the tape drive and the repository. As such, the certain embodiments of the present invention essentially require only two major movements of the robotic transporter 124: from the shelf system to the tape drive 130 and from the tape drive 130 back to the shelf system 115, whereas conventionally the robotic transporter 124 requires three major movements: from the shelf system to the tape drive, from the tape drive to the shelf system, and from the shelf system to the tape drive. The present invention reduces the travel of the robotic transporter 124, thereby improving time efficiency and reducing wear on the robotic transporter 124.

As mentioned above, preferably the robotic transporter 124 may remain stationary, and only the picker 122 moves when transporting tape cartridges between the tape drive and the repository and vice-versa. In other words, both the tape drive and the repository are within the range of the picker 122 when the robotic transporter 124 is in a stationary position near both the tape drive and the repository.

It will also be appreciated that the temporary repository 112 may only hold the a tape cartridge for a relatively short period of time. Preferably such time period is less than one minute, more preferably less than thirty seconds, and even more preferably less than five seconds.

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, multiple repository slots 112 can be used to support multiple tape cartridges 120 or, optionally, one repository slot 112 can be arranged to support multiple tape cartridges 120, for example, while still maintaining substantially the same functionality without departing from the scope and spirit of the present invention. Another example can include using these techniques across multiple library partitions, to name a few examples while still maintaining substantially the same functionality without departing from the scope and spirit of the present invention. Further, though communication is described herein as between a client and the library, such as the library 100, communication can be received directly by addressable components, such as the first drive 130, via the interface device 106, for example, without departing from the scope and spirit of the present invention. Further, for purposes of illustration, a first and second tape drive and first and second tape cartridges are used herein to simplify the description for a plurality of tape drives and tape cartridges. Additionally, as touched upon in conjunction with FIG. 7, multiple robotic transporters can work together with either a common or separate repository 112 to enhance move efficiency. Finally, although the preferred embodiments described herein are directed to tape cartridge systems, such as the tape cartridges and tape storage systems, such as a tape library and tape drives, and related technology, it will be appreciated by those skilled in the art that the teachings of the present invention can be applied to other systems, such as solid state media adapted to be moved or other storage related "cartridges", without departing from the spirit and scope of the present invention.

It will be clear that the present invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the invention disclosed and as defined in the appended claims.

What is claimed is:

1. A data storage library comprising:
   a temporary repository located near said drive that supports a second data cartridge after it was located in a magazine and before it will be loaded in said drive;
   a first data cartridge disposed in said magazine after being moved from said drive, said first data cartridge disposed in said magazine while said second data cartridge is disposed in said temporary repository.

2. The data storage library of claim 1 further comprising a magazine that possesses a plurality of slots wherein each slot is adapted to accommodate a data cartridge, said magazine is portable and moved between said drive and a shelf system within said data storage library via a robotic transporter.

3. The data storage library of claim 1 wherein said second data cartridge resides in a first magazine slot in said magazine prior to being moved to said temporary repository and said first data cartridge is disposed in said first magazine slot when disposed in said magazine, said first magazine slot is identifiable by a second logical address associated with said second data cartridge when said second data cartridge is disposed therein but said first magazine slot is identifiable by a first logical address when said first data cartridge is disposed therein.

4. The data storage library of claim 3 wherein a map associating said first magazine slot with said second address is maintained by said data storage library.

5. The data storage library of claim 4 wherein a host computer identifies said first slot as said second address based on said map.

6. The data storage library of claim 1 wherein said temporary repository is not identifiable via an address by a host computer.

7. A data storage library arranged to perform a method, the method comprising:
   moving a second portable data cartridge from a second slot in a portable magazine to a temporary repository;
   disposing said second portable data cartridge in said temporary repository;
   after moving said second tape to said temporary repository, moving a first portable data cartridge from a data transfer device to said portable magazine and disposing said first portable data cartridge therein; and
   transferring said second portable data cartridge from said temporary repository to said data transfer device and loading said second portable data cartridge therein.

8. The data storage library of claim 7 further comprising moving said portable magazine from a shelf system within said data storage library to a position near said data transfer device.

9. The data storage library of claim 7 wherein said portable data cartridge is a tape cartridge or a tape drive cleaning cartridge and said data transfer device is a tape drive.

10. The data storage library of claim 7 further comprising:
    receiving a first set of instructions from a host computer to unload said first portable data cartridge from said data transfer device and return said first portable data cartridge to an associated slot addressed to correspond to said first portable data cartridge;
    responding to said host computer that said first set of instructions are complete, even though said first set of instructions have not been physically carried out;
    receiving a second set of instructions from said host computer to move said second portable data cartridge from said second slot and load said second portable data cartridge in a cooperating relationship with said data transfer device;
    transporting said second portable data cartridge near said data transfer device via a robotic transporter wherein said second portable data cartridge is disposed in said portable magazine.

11. The data storage library of claim 10 wherein said steps are performed in the order presented.

12. The data storage library of claim 10 further comprising queuing said first and said second set of instructions in memory.

13. The library of claim 10 wherein said robotic transporter is controlled via a controller, the controller receives move instructions from a processor, the move instructions are maintained in a storage device, all of which are comprised by the storage library.

14. The data storage library of claim 7 further comprising remapping said second slot from a second address corresponding with said second portable data cartridge to a first address corresponding with said first portable data cartridge.

15. The data storage library of claim 14 wherein said first portable data cartridge is identified by a host computer via a logical map maintained by said data storage library that presents a location associated with said first address.

16. The data storage library of claim 7 wherein moving said second portable storage cartridge from said second slot to said data transfer device is accomplished via a cartridge picking device.

17. A storage library arranged to perform a method, the method comprising:
    receiving a first set of instructions from a host computer to unload a first data storage cartridge from a cartridge data transfer device and return the first data storage cartridge to a designated location in a shelf system;
    responding to the host computer that the first set of instructions are complete, even though the first set of instructions have not been physically carried out;
    receiving a second set of instructions from the host computer to move a second data storage cartridge from said shelf system and load said second data storage cartridge in the cartridge data transfer device;
    transporting the second data storage cartridge from the shelf system to a position where a picker device is capable of disposing the second data storage cartridge in the cartridge data transfer device, said second data storage cartridge is disposed in a magazine that accommodates a plurality of data storage cartridges;
    removing the second data storage cartridge from the magazine via said picker device and disposing the second data storage cartridge in a repository;
    removing the first data storage cartridge from the cartridge data transfer device;
    disposing said first data storage cartridge in said magazine;
    moving the second data cartridge from the repository via the picker device;
    loading the second data storage cartridge in the cartridge data transfer device;
    transporting the magazine possessing the first data storage cartridge back to the shelf system.

18. The method of claim 17 wherein said magazine possesses a plurality of slots that each have a logical address, each of said plurality of slots are arranged to accommodate one data storage cartridge, and wherein said first data storage cartridge is disposed in said magazine in a first slot associated with a first slot address but prior to said first slot being associated with said first slot address, said first slot was associated with a second slot address associated with said second data storage cartridge.

19. The method of claim 17 wherein the steps are performed in the order of a) removing the second data storage cartridge from the magazine via said picker device and disposing the second data storage cartridge in a repository; b) removing the first data storage cartridge from the cartridge data transfer device; c) disposing said first data storage cartridge in said magazine; d) moving the second data cartridge from the repository via the picker device; e) loading the second data storage cartridge in the cartridge data transfer device.

20. The method of claim 17 wherein the repository is located within twelve inches of the cartridge data transfer device.

* * * * *